Dec. 11, 1934.  L. J. KINNARD  1,984,308
CONTROL SYSTEM
Filed June 8, 1927  6 Sheets-Sheet 1

INVENTOR
Luther J. Kinnard.
BY
ATTORNEY

Dec. 11, 1934.      L. J. KINNARD      1,984,308
CONTROL SYSTEM
Filed June 8, 1927       6 Sheets-Sheet 5

WITNESSES:
INVENTOR
Luther J. Kinnard.
BY
ATTORNEY

Dec. 11, 1934.   L. J. KINNARD   1,984,308
CONTROL SYSTEM
Filed June 8, 1927   6 Sheets-Sheet 6

WITNESSES:
E.A. McCloskey
C.G. Minkler

INVENTOR
Luther J. Kinnard.
BY
ATTORNEY

Patented Dec. 11, 1934

1,984,308

UNITED STATES PATENT OFFICE 1,984,308

CONTROL SYSTEM

Luther J. Kinnard, Chicago, Ill., assignor to Westinghouse Electric Elevator Company, a corporation of Illinois Application June 8, 1927, Serial No. 197,279

68 Claims. (Cl. 187—29)

My invention relates to control systems and has particular relation to systems employed for elevators, hoists and similar mechanisms.

An object of my invention is to provide a control system for elevators wherein the passengers control the movements of the car without the necessity of having an attendent on the car.

Another object of my invention is to provide a control system for elevators wherein the car is automatically controlled by push-buttons to operate in exactly the same manner as a car operated by an attendant who controls his car in response to the usual elevator signals.

Another object of my invention is to provide a control system for elevators wherein a passenger, at one floor, desiring to use the elevator, may operate a button at that floor corresponding to the direction in which he wishes to travel, and wherein the operation of such button will automatically cause the car to move to the floor and stop thereat, only when the car is prepared to travel in the desired direction.

Another object of my invention is to provide a control system for elevators wherein a number of persons desiring to use the elevator may operate at the several floors, call buttons corresponding to the direction in which each wishes to travel and wherein the elevator will stop successively at the floors, in the natural order of approach to the floors, as distinguished from the order in which the buttons were operated.

Another object of my invention is to provide an elevator control system wherein the elevator will automatically respond to a plurality of operated call buttons, stopping for passengers desiring service in one direction only when traveling in that direction, and wherein the elevator will reverse its direction of travel at any point when no call exists for service at any further point in the first direction of travel.

Another object of my invention is to provide a control system for elevators wherein the car is controlled automatically by buttons operated by the persons desiring to use the car, and wherein the call buttons are operative at all times regardless of the position of the car, whether the car is moving or standing at a floor, whether the doors are open or closed and whether other call buttons have been operated or not.

Figure 1:
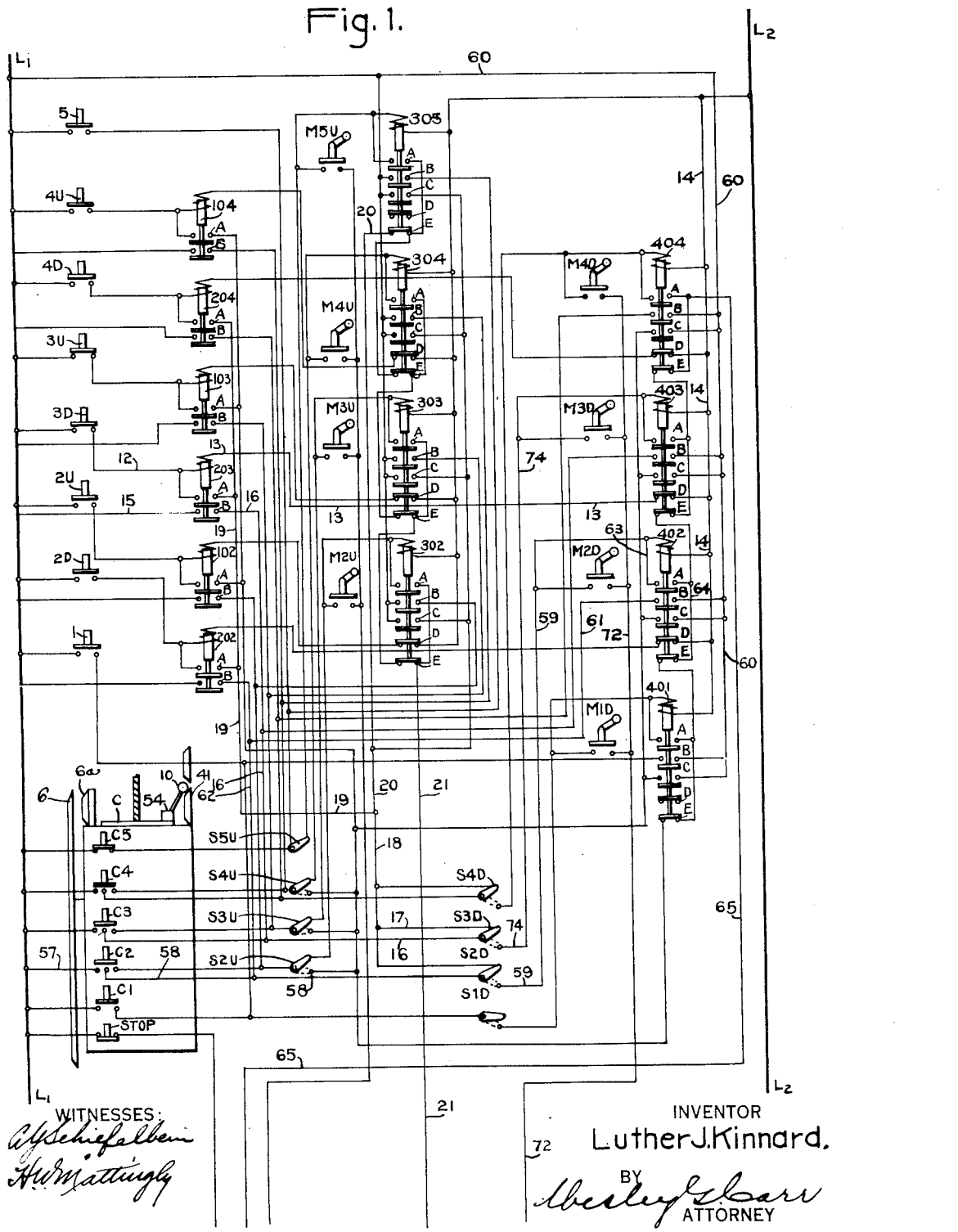
Figure 2:
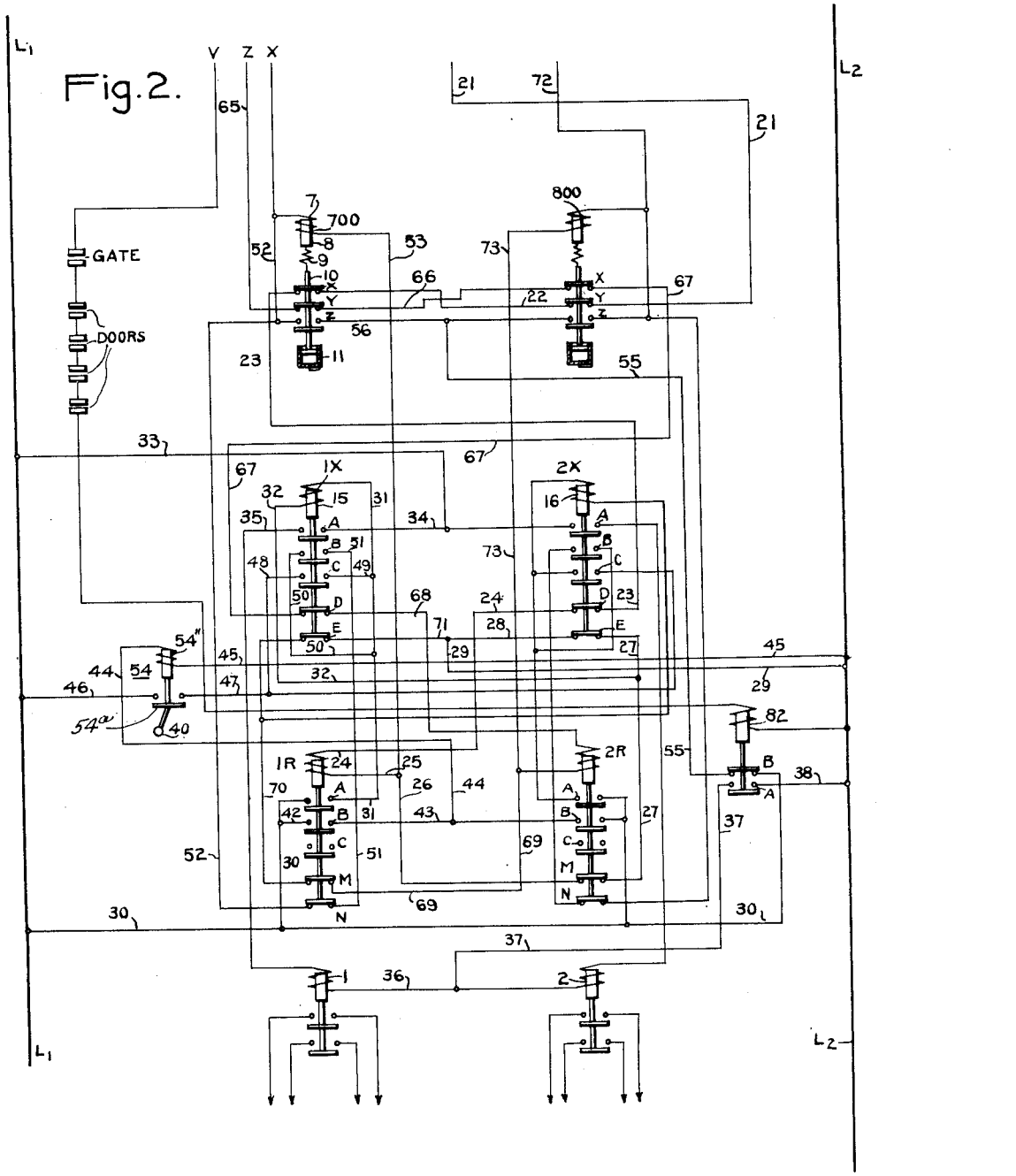
Figure 3:
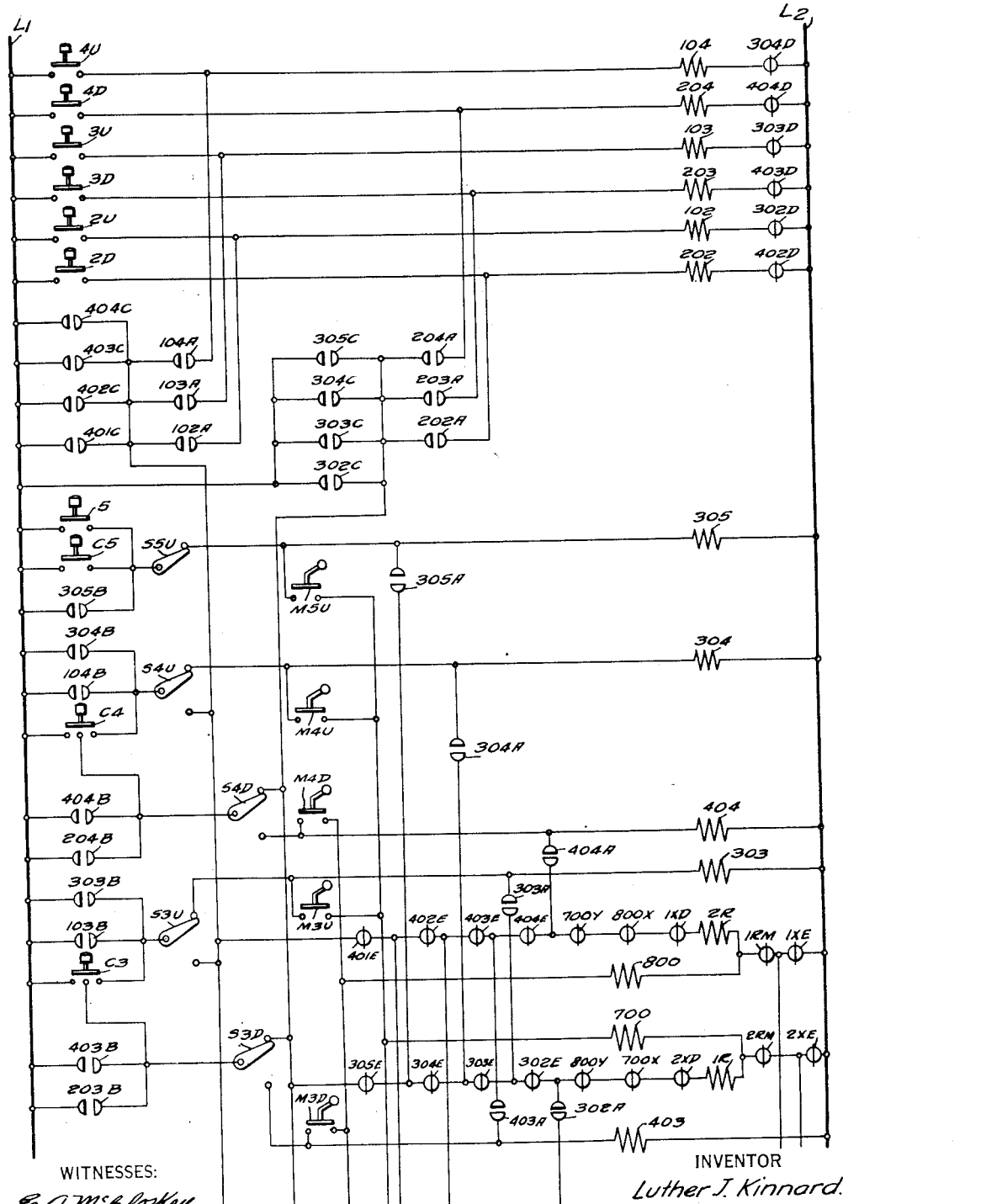
Figure 4:
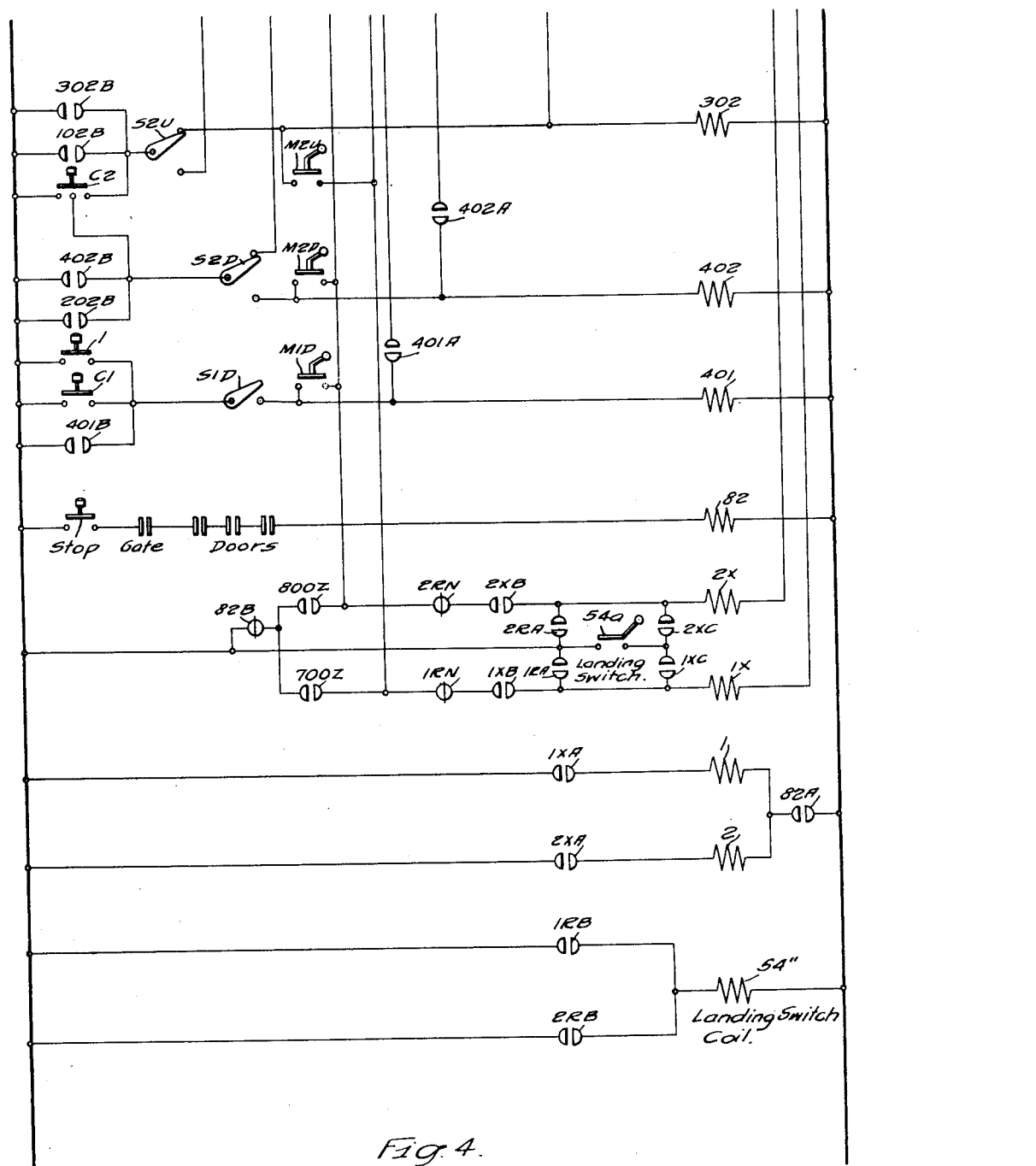
Figure 5:
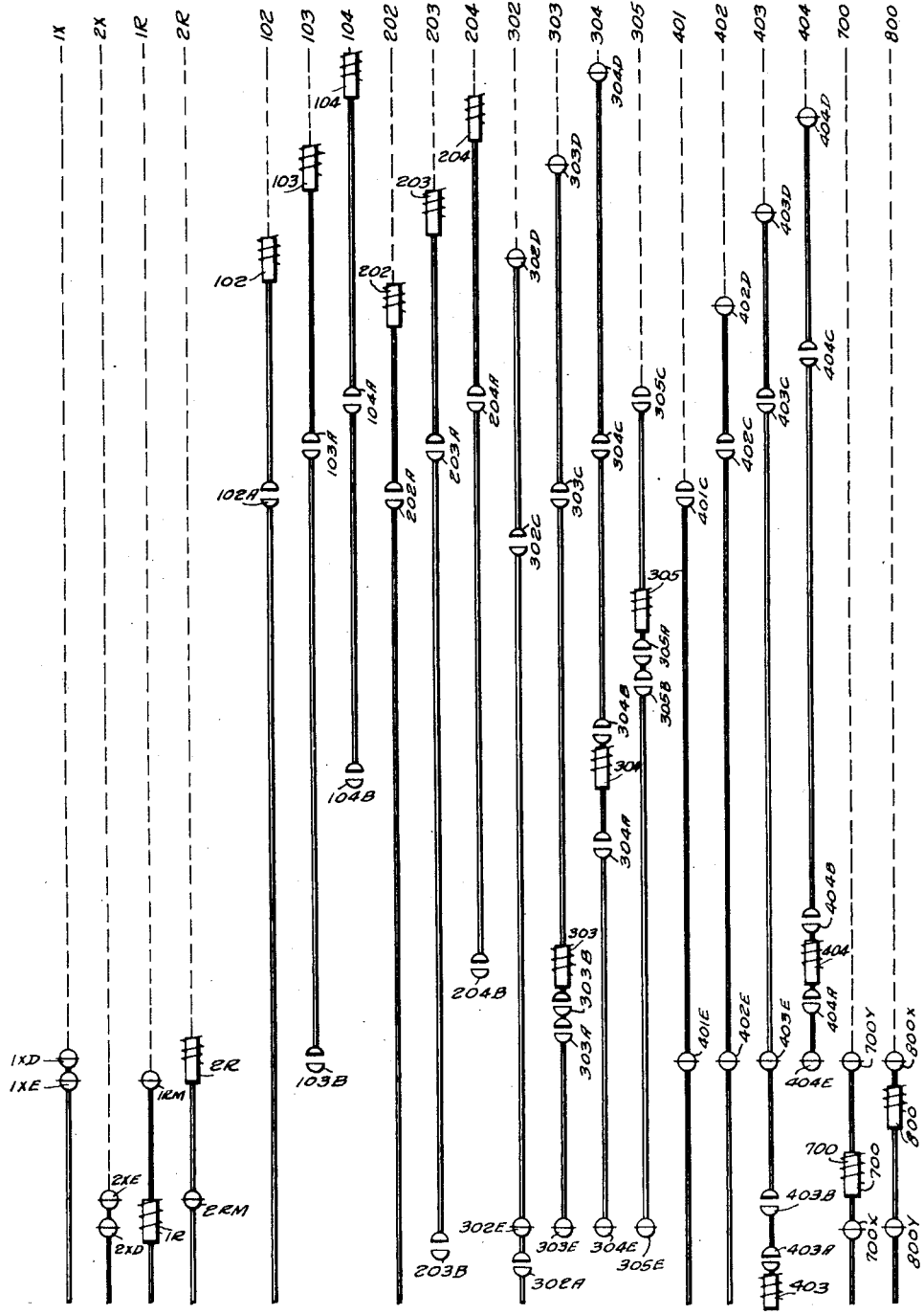
Figure 6:
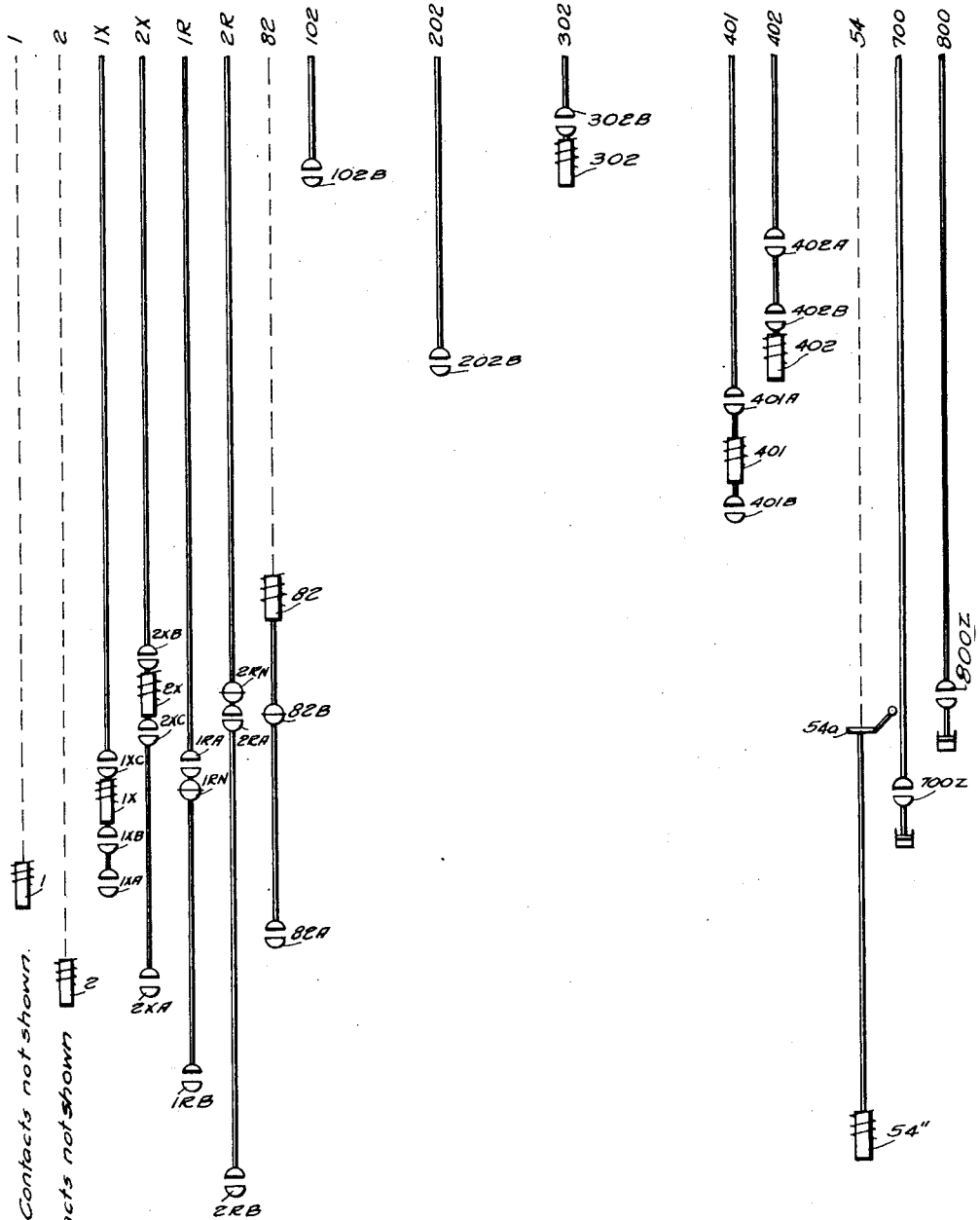

Other objects of my invention will become evident from the following description, taken in connection with the accompanying drawings, wherein, Figures 1 and 2 jointly comprise a schematic wiring diagram of a complete system of control embodying my invention, exclusive of the motor and other driving gear for the elevator, Figs. 3 and 4 jointly comprise a schematic or straight-line illustration of the circuits and apparatus shown in Figs. 1 and 2; and Figs. 5 and 6 are intended as key sheets to assist in the location of coils and contacts shown on Figs. 3 and 4.

The connections and apparatus shown on Figs. 3 and 4 duplicate those shown in Figs. 1 and 2, the same reference characters being applied to the same coils and contact members in both groups of figures. In Figs. 1 and 2, the various conductors are also given reference characters. Corresponding conductor numbers are not applied to Figs. 3 and 4, because of the different form of drawing employed. Throughout the following description, reference may be had either to Figs. 1 and 2, in which case all reference characters are applicable, or to Figs. 3 and 4, in which case only the reference characters for coils and contact members are applicable.

Figs. 5 and 6 serve as a guide to the location of coils and contact members on Figs. 3 and 4. Any coil or contact member shown in either Fig. 5 or Fig. 6 occupies the same horizontal position on that sheet as the correspondingly numbered coil or contact member on Fig. 3 or Fig. 4.

Referring to the drawings, a plurality of push-buttons 5, 4U, 4D, 3U, 3D, etc., are mounted at the various floors served by the elevator, for operation by persons desiring to use the car C. One button only is provided for each of the terminal floors, while the intermediate floors each have two buttons, one for "up" service and one for "down". Push-button relays 102, 103 and 104 are shown as respectively connected to the "up" buttons 2U, 3U and 4U. A series of "down" push-button relays 202, 203 and 204 are shown as respectively connected to the "down" buttons 2D, 3D and 4D.

A series of "up" floor relays are respectively numbered 302, 303, 304 and 305, and are connected to contact members S2U, S3U, etc. of a floor selector assembly. A series of "down" floor relays 401, 402, 403 and 404 are respectively connected to contact members S1D S2D, etc. of the floor selector.

A series of double-contact push-buttons, one for each of the floors, are shown located on the car and numbered C1, C2, C3, C4 and C5. Button C1 is connected to the switch arm of the floor selectors S1D, whereas, button C2 is connected to both contact members S2U and S2D. The remaining buttons are respectively connected to their corresponding floor selector switches. These buttons are designed to be operated by passengers on the car to cause the car to travel to the floors at which the passengers wish to leave the car.

Each of the push-button relays and the floor relays is provided with a self-holding circuit, so that each relay, upon energization through its corresponding push-button, remains energized until the car enters the "slow down" zone for the corresponding floor. This de-energization of the relays is caused by the arrangement of the switches on the floor selector, which may readily be understood by reference to Fig. 1 and as hereinafter explained.

The floor selector may be of any suitable type, wherein a pair of switches are moved from one circuit-closing position to an open-circuit position, and then to a second circuit-closing position as the car passes the corresponding floor. The form of floor selector shown may comprise a series of switches mounted in the hatchway, one for each floor for each direction which are operated to their various positions by a cam 6 carried by the car.

The cam 6 is shown as extending beyond the center of the car a distance which is equal to the distance the car will travel between the initiation of the stopping operation and the final stopping of the car. Thus, if the switches S2U and S2D are mounted at a distance above the second floor level which is equal to one half the height of the car the car will be brought to a stop level with the floor in the manner hereinafter described. The switches are shown in Fig. 1 in their relative positions when the car is at the first floor, that is, S1D is open, while the remainder are in closed-circuit position with respect to their upper contact members.

An "up" direction preference relay 700 is shown provided with a coil 7 and a movable armature member 8, the latter being connected by a lost-motion connection, represented by a spring 9, to a switch-operating member 10. The switch-operating member 10 is given a timed movement in the "drop out" direction by means of a retarding device such as a dash-pot 11, the purpose of which will be explained later. A similar relay 800 is provided for "down" preference.

An "up" relay 15 and a "down" relay 16 are shown for controlling the "up" and "down" motor-controlling switches 1 and 2, respectively. A pair of relays 1R and 2R are shown for controlling the relays 1X and 2X respectively, being used to maintain the hoisting motor circuits operative subject to the operation of a landing switch 54 hereinafter described.

The apparatus may best be described in connection with the operation of the system. Assuming the car to be standing at the first floor and a person to be at the third floor and desiring to travel downwardly, such person operates the third floor "down" button 3D. This action establishes a circuit to the down push-button relay 203, extending from line conductor L1, through push-button 3D, conductor 12, coil of relay 203, conductor 13, normally closed contact members 403D, and conductor 14 to line conductor L2. Relay 203 closes its contacts 203A and 203B, the latter closing a holding circuit for relay 203 by way of line conductor L1, conductor 15, contact members 203B, conductor 16, floor selector switch S3D, conductors 17 and 18, contact members 203A, coil of relay 203, conductor 13, contact members 403D, and conductor 14, to line conductor L2. A circuit for relay 1R is also completed through contacts 203B from line conductor L1, through conductor 15, contact members 203B, conductor 16, floor selector switch S3D, conductors 17, 18 and 20 and serially through the E contact members of the up-floor relays 305, 304, 303 and 302, conductor 21, contact members 800Y, conductor 22, contact members 700X, conductor 23, contact members 2XD, conductors 24, coil of relay 1R, conductors 25 and 26, contact members 2RM, conductor 27, contact members 2XE and through conductors 28 and 29, to line conductor L2.

Relay 1R controls the high-speed connections (not shown) for the elevator-hoisting motor. Since the details of the hoisting motor are not material in this system, the motor and the mechanism for controlling the speed thereof has been omitted. Relay 1R controls the energization of the up-directional relay 1X by way of line conductor L1, conductor 30, contact members 1RA, conductor 31, coil of relay 1X, conductors 32 and 27, contact members 2XE, conductors 28 and 29 to line conductor L2. Relay 1X, in turn, controls the up-motor switch 1 by way of line conductor L1, conductors 33 and 34, contact members 1XA, conductor 35, coil of relay 1, conductors 36 and 37, contact members 82A, and conductor 38, to line conductor L2.

Relay 82 is a safety relay, the coil of which is connected in circuit with the usual safety switches controlled by the opening of the doors for the hatchway and the elevator gate and, in the system illustrated, this relay is also controlled by a normally closed "Stop" button mounted on the car. Thus relay 82 is energized at all times when the doors for the hatchway and the car gate are closed.

A landing switch 54, of the usual type used on automatic push-button control elevators, is provided in this system and comprises a switch operable to closed-circuit position by a coil indicated as 54, and also operable to a closed-circuit position by means of a roller 40 engageable by a pair of cams 41 (Fig. 1) mounted in the hatchway. The switch 54 is mounted on some convenient portion of the elevator in a position to have its roller 40 properly engaged by the cams 41. The mounting of the roller and the mounting of the cams with reference to the floors with which the cams are associated is such that at the instant the floor of the car is level with the floor of the building, the roller 40 will have assumed a position which is between the ends of the two cams 41, thus allowing the roller to move and permit the contacts of the switch to open at this time.

The relay 1R, when energized, closes a circuit to the coil 54" of the landing switch by way of line conductor L1, conductors 30 and 42, contact members 1RB, conductors 43 and 44, coil 54", conductor 45 to line conductor L2. The operation of landing switch 54 closes a holding circuit for the relay 1X by way of line conductor L1, conductor 46, contact members 54A, conductors 47 and 48, contact members 1XC, conductors 49 and 31, coil of relay 1X, conductors 32 and 27, contact members 2XE, conductors 28 and 29 to line conductor L2. Thus the relay 1X is maintained in circuit-closing position independent of the position of relay 1R until the contacts of relay 54 open.

The energizing of "up" motor switch 1 causes the car to start upwardly, and the car continues up the shaft until it arrives at the "slow" down zone for the third floor. At this time the cam carried by the car will engage switch S3D and move the same to an open-circuit position, thus opening the previously traced holding circuit for relay 203 and the circuit for relay 1R, whereupon these two relays drop out.

When relay 1R is deenergized, it closes contacts 1RN and permits current to pass through the coil of the "up" directional-preference relay 700 by way of line conductor L1, conductor 46, contacts 54a of relay 54, conductors 47 and 48, contact members 1XC, conductors 49, 31 and 50, contact members 1XB, conductor 51, contact members 1RN, conductor 52, coil conductors 53 and 26, contact members 2RM, conductor 27, contact members 2XE, and conductors 28 and 29 to line conductor L2. The purpose of this operation will be explained later.

In dropping out, relay 1R also deenergizes the landing switch coil 54", by interrupting the circuit thereof at contact members 1RB, thus allowing the roller 40 to drop upon the cam 41. The contacts of relay 54 do not open, however, and the car continues to travel until it has arrived at the floor level, at which time the roller 40 drops off the cam 41 and breaks the circuit through contacts of relay 54 to the coil of relay 1X. Relay 1X, in turn, deenergizes the "up" motor switch 1 and the car stops level with the floor.

Since the purpose of this control system is to permit the car to serve more than one call on a single trip, it is desirable to prevent the car from instantly starting to answer other calls, or starting before the passenger at the first stop has had an opportunity to open the door. This result is provided for by the timing of the action of relay 700, in that when the relay 700 is energized, as previously described, the circuits for the "up" and "down" relays 1R and 2R are respectively broken at 700X and 700Y. When the car stops in response to the opening of the landing switch 54, the circuit for relay 700 is also deenergized and thereby starts to drop out, being retarded by the effect of the dash-pot 11 provided for this switch. The period required for relay 700 to close its contacts X and Y may be adjusted for any suitable time, ten seconds having been determined by experiment and observation to be about the length of time necessary to give the passenger or person desiring to use the car ample opportunity to open the door.

Upon opening the door at the third floor the relay 82 is deenergized, as previously described, and through its contacts 82A maintains the circuit for both the "up" and the "down" motor switches 1 and 2 inoperative until the door is again closed. Relay 82, when deenergized, closes its contacts 82B, which again energizes the coil of relay 700 by way of a circuit which extends from line conductor L1, through conductor 30, contact members 82B, conductors 55, and 56, contact members 700Z (which because of the retarding action of the dash-pot have not yet had an opportunity to open), coil of relay 700, and conductor 53 to line conductor L2, as previously described for this coil.

The person at the third floor now enters the elevator and closes the doors, thus again energizing the relay 82 and breaking the circuit to coil 7. Relay 700 slowly drops out, again consuming an interval of, say, 10 seconds during which time the passenger has an opportunity to press the car button corresponding to the floor to which he wishes to travel, before the circuits to either the "up" or the "down" relays 1R or 2R may again be closed by any previously registered call.

For purposes of illustration we will assume that the person now on the elevator desires to travel to the second floor and he, therefore, presses the second floor car button C2. At this time the car is above the second floor and the floor selector switches S2U and S2D have assumed positions indicated by the dotted lines. Thus the operation of button C2 closes a circuit to relay 402, by way of a circuit extending from line conductor L1, conductor 57, button C2, conductor 58, switch S2D, conductor 59, coil of relay 402, conductor 14 to line conductor L2. Relay 402 closes a self-holding circuit by way of line conductor L1, conductor 60, contact members 402B, conductors 61, 62 and 58, switch S2D, conductor 59, coil of relay 402, conductor 14, to line conductor L2. Relay 402 also closes a circuit to the down relay 2R by way of a circuit extending from line conductor L1 through conductor 60, contact members 402B, conductors 61, 62 and 58, switch S2D, conductors 59 and 63, contact members 402A, conductor 64 and serially through the E contact members of relays 403 and 404, conductor 65, contact members 700Y, conductor 66, contact members 800X, conductor 67, contact members 1XD, conductor 68, coil of relay 2R, conductor 69, contact members 1RM, conductor 70, contact members 1XE, conductors 71 and 29 to line conductor L2. The energization of relay 2R closes the circuit to relay 2X, which in turn closes the "down" motor switch 2 in the manner described for the operation of relays 1X and 1. The landing switch 54 operates in the manner previously described to maintain a holding circuit for relay 2X.

The car starts downwardly and continues until it arrives at the slow-down zone for the second floor at which time the cam 6a engages and operates a momentary contact switch M2D. The switch M2D is so connected that the momentary action of this switch closes the circuit to directional-preference relay 800, by way of a circuit extending from line conductor L1 through conductor 60, contact members 402B, conductors 61, 62 and 58, switch S2D, conductor 59, switch M2D, conductor 72, coil of relay 800, conductors 73 and 69, contact members 1RM, conductor 70, contact members 1XE, conductors 71 and 29 to line conductor L2. The energization of relay 800 breaks the circuit to relay 2R by way of its contacts 800X. Relay 2R thus drops out and the stopping operation is the same as previously described for the third floor.

If during the time the car was answering the first call such as we have previously described, some other person desired to go upwardly, for example, from the second floor, and had operated the second-floor up-button 2U, this would have caused the car to stop at the second floor, while on its way up the shaft, in response to the first call, that from the third floor, and would permit the second-floor passenger to receive his service without having to wait for the car to completely answer the previously-operated third-floor call. It is obvious that if the car is going up the shaft in order to respond to a call for service, it would be inefficient to permit the elevator to pass floors at which other persons desire service in the up-direction when it is possible to permit the car to take on these passengers while answering the first call. Thus my system is designed to allow the car, when moving in one direction, in answer to one call, to also take on passengers desiring to go in that direction, at other floors, even though the buttons at these floors have been operated subsequently to the operation of the original call.

This result is accomplished with my apparatus in the following manner. Assuming the elevator to be at the first floor and to start upwardly in response to the third floor down-button, as described above, I now further assume that a person at the second floor desires to travel upwardly and operates the button 2U. This action energizes the second floor "up" floor relay 302 through the switch S2U in the manner previously described for the operation of the floor relay 402. Relay 302 closes a holding circuit for itself, as described for relay 402. The car travels upwardly toward the second floor. As the car approaches the "slow down" zone for the second floor the momentary contact switch M2U is operated to energize relay 700 and thus deenergizes in turn relays 1R, 54, 1X and 1 and brings the car to a stop at the second floor.

It will be noted that the circuit previously traced for the third floor down-button and the relay 203 included in series relation the E contactors of relays 305, 304, 303 and 302. Thus the operation of relay 302 breaks this circuit at the contacts 302E but makes a circuit around this contact by way of its contacts 302A, connecting the switch S2U to the wire 21 through the contacts 302A. When the car stops at the second floor, the relay 302 is deenergized by the shifting of the switch S2U to open-circuit position, and thus the circuit for the third floor is reestablished through the contacts 302E. The operation of the direction-preference relay 700 prevents the car from immediately restarting toward the third floor until the passenger at the second floor has had an opportunity to open the door, board the car, and operate the desired car button.

Assume that the passenger who entered at the second floor desires to go to the fourth floor and presses the fourth floor car button 4. This will complete a circuit to the fourth floor relay 304 and at the expiration of the ten-second interval, after he closes the doors, the car will start upwardly. The operation of relay 304 opens the circuit previously traced for the third floor operation of the contacts 304E. The car now approaches the slow-down zone for the third floor, and switch S3D is moved to open-circuit position, but at this time the relay 304 is maintaining a circuit at the relay 1R exclusive of the switch S3D, and the opening of this switch, therefore, does not stop the car at the third floor. The car continues to travel toward the fourth floor and, in passing the third floor, the switch S3D is moved to its dotted-line position, applying current to relay 403, by way of a circuit which extends from line conductor L1 through conductor 15, contact members 203B, conductor 16, switch S3D, conductor 74, relay 403 and conductor 14 to line conductor L2. This operation of relay 403 breaks the holding circuit for relay 203 at contacts 403D and simultaneously closes a holding circuit for relay 403. Relay 403 partially completes a circuit for the operation of relay 2R, which is open, however, at contacts 1RM and 1XE. The car, therefore, continues to travel upwardly until it reaches the slow-down zone for the fourth floor, at which time the momentary contact switch M4U is closed, thereby energizing relay 700, and the car stops at the fourth floor in the manner previously described. The passenger leaves the car, closes the hatchway door and, after the ten-second interval elapses, the contacts 700Y close, permitting the energization of coil 2R. It must be remembered that relays 1R and 1X have been deenergized by the stopping of the car at the fourth floor and thus the circuit for relay 2R may be completed. The car, therefore, starts downwardly and stops at the third floor in response to the operation of the momentary contact switch M3D.

In this manner it is seen the car will stop in response to the operation of the call button only when the car is in condition to travel in the direction corresponding to that for which the button was operated, i. e., when the car is on its way in that direction or there are no other calls for service at further points in the other direction of travel. As soon as no calls exist for service at further points in that direction, the car will reverse and make the next stops in response to calls for service in the new direction.

A further feature of my invention is that of direction preference. To illustrate, assume that, in the operation last described, between the time the car left the second floor and its arrival at the fourth floor, the person should operate the fifth floor button, the following operation will occur:

Relay 305 is energized and the relay 700 in releasing its contacts, when deenergized, closes its contacts 700X, just prior to closing of contacts 700Y. This action will cause the energization of relay 1R before relay 2R can operate and through the contacts 1RM, of relay 1R, the relay 2R is positively prevented from closing. The car, therefore, continues on its up-trip to the fifth floor, taking on the passenger at the fifth floor and then starts downwardly to answer the third floor down-call.

Thus it is seen that I have provided an elevator control system wherein the car may serve a plurality of passengers desiring to travel in either direction, in a single trip for the car, wherein the car will reverse its direction when no calls for service at points further in the first direction exist, wherein the car will render a service which is in all respects the equivalent to that rendered by cars operated by an attendant on the car responding to signals actuated by persons desiring to use the car, and wherein the car will stop at the floors only when the car is prepared to travel in the direction corresponding to that in which the passenger has indicated his desire to go.

Moreover, the call buttons 1, 2U, 2D, etc., at the landings are continuously in operable condition, that is, regardless of the position of the car, or whether the car is in the course of answering some other call, all of the buttons are in condition to be operated to register calls for the car as distinguished from prior devices wherein "non-interference" devices presented effective operation of any button while the car is answering another call or similar devices are used to restrict the use of the car to single calls at any one time, and it is necessary to again operate the button after the car has completed its operations in answer to a prior call or calls.

It will be observed that the operation of the floor selector switches S2U and S2D occur, as described, at the slow-down points for the associated floor when the car approaches from either direction; thus as soon as the car enters a slow-down zone, the switch for that floor is opened. This feature is important in elevators operating at high speeds since it prevents the car from being controlled by the operation of a button at such time as the car is within the "slow-down" zone for the associated floor.

The car would not make a stop level with the landing in the distance less than the zone and unless the button is rendered ineffective at such times a very inefficient operation would be produced.

No hoisting motor mechanism has been shown, since this system is equally adaptable to all forms of hoisting motor control systems; for example, either the Ward-Leonard system or rheostatic control.

The description is entirely illustrative and the apparatus may be varied in many ways, and I do not desire to be limited by the details shown or described, but only in accordance with the scope of the appended claims.

I claim as my invention:

1. In a control system for an elevator car operable in a hatchway past a plurality of floors, car and hatchway closures, call means for dispatching said car to each of the floors, for travel in one direction, call means for dispatching said car to each of said floors for travel in another direction, means for causing said car to respond to an operated call means, to stop said car successively at other floors for which call means have subsequently been operated corresponding to the direction in which said car must travel toward said first-operated call means, and, responsive to an operated call means for a floor which the car has passed while traveling toward said first operated call means, for reversing said car after stopping at the farthest floor in said direction for which a call means has been operated, means operated by the opening of a closure for rendering said car inoperative to respond to any call means, and means for preventing said car from responding to a call means for the other direction for a predetermined time after said closure has been closed.

2. In an elevator control system, a car, call means for dispatching said car to each of the floors, for travel in one direction, call means for dispatching said car to each of said floors for travel in another direction, means for causing said car to respond to an operated call means, to stop said car successively at other floors for which call means have subsequently been operated corresponding to the direction in which said car must travel toward said first-operated call means for the said direction, and timed means for giving preference to calls for the first direction over calls for the opposite direction.

3. In a control system for an elevator operating between two terminal floors and one or more intermediate floors, an "up" calling means at each intermediate floor and the lower terminal floor, a "down" calling means at each intermediate floor and the upper terminal floor for causing said car to move to the corresponding floor, means, effective during upward travel of the car, for successively stopping said car at the floors for which "up" calling means have been operated and for stopping said car at any floor for which a down control has been operated provided no control is operated for a floor higher than said any floor, and means, effective during downward travel of the car, for successively stopping said car at the floors for which a "down" calling means has been operated and for stopping said car at any floor for which an up control has been operated provided no control is operated for a floor lower than said any floor.

4. In an elevator control system, a car serving a plurality of floors, passenger-operated means for each floor for calling the car to the corresponding floor to take a passenger in one direction and for stopping said car when it arrives at said floor, means for each floor for calling the car to the corresponding floor to take a passenger in the other direction and for stopping said car when it arrives at said floor, means for preventing said passenger-operated means for one direction from stopping said car when said car is approaching from said other direction when another passenger-operated means has been operated to call the car to a further floor in said other direction.

5. In a control system for a car operative between two terminal stations and one or more intermediate stations, calling means at each intermediate station and one of said terminal stations for dispatching the car to the corresponding station for movement toward said other terminal station, calling means at each of said intermediate stations and said other terminal stations for dispatching said car to the corresponding station for movement toward said one terminal station, means operated by and in accordance with the movements of said car, for stopping said car at a station for which a calling means has been operated, means responsive to the operation of any of said first-named means for preventing said car from stopping in response to any of said first-named means when said car is on its way towards said one terminal and any calling means between the then position of the car and that terminal has been operated, means responsive to operation of any of said second-named means for preventing said car from stopping in response to any of said second-named means when said car is on its way toward the other terminal and any calling means between the then position of the car and said other terminal has been operated, means for stopping said car successively at the stations for which said second-named means has been operated when said car is on its way toward said one terminal, and means for stopping said car successively at the stations for which said first-named means has been operated when said car is on its way toward said other terminal.

6. A control system for an elevator car comprising two control means for each of a plurality of landings effective to initiate movement of the car upwardly or downwardly directly to a landing for which a control means is actuated, the farthest up and farthest down actuated control means determining the ultimate points of car movement for any one trip upwardly and for any one trip downwardly respectively, said control means effective so that those actuated before the car reaches a predetermined distance from their respective landings intercept the car at said landings upon the car's first arrival thereat, and those actuated after the car reaches said predetermined distance intercept the car upon a subsequent arrival, and means effective automatically to start the car in an original direction as determined by a farthest actuated control means, from landings at which it is intercepted and to start the car in reverse directions after the car stops its trips to said ultimate points of dispatch.

7. A control system for an elevator car comprising an up and a down control means at each of a plurality of landings, either one at each landing effective to initiate movement of the car toward its landing from a position above or below same, either of the farthest up and farthest down actuated control means at a landing bringing the car to its respective landing before reversal is normally effective, only the up control means at each of said landings which are actuated prior to car arrival being effective when the car is under dispatch upwardly to intercept the car on its first approach and said up control means which are actuated subsequently to car arrival being effective to stop the car on its next up approach, and only down control means at each of said landings which are actuated prior to car arrival when the car is under dispatch downwardly effective to intercept it on its first approach, and said down control means which are actuated subsequently to car arrival being effective to stop the car on its next down approach.

8. A control system for an elevator car comprising two control means at each of a plurality of landings effective so that either control means at any landing actuated while the car is moving therefrom, initiates reverse movement of the car to return it to its landing, and in the absence of any control means at a landing beyond in the direction of said return movement of the car being actuated, whichever control means initiates said return movement also causes its stop during said return movement, and in the event of a control means at such a landing beyond being actuated during such return movement, only one control means at the landing from which said return movement of the car is initiated is effective to stop such return movement of the car, and the other control means at the latter landing, regardless of whether or not it initiated said return movement, is ineffective to stop such return movement, but is effective by the single actuation and when the car completes said return movement to a predetermined point, to cause reverse movement of the car and stop it when the car again reaches its landing.

9. A control system for an elevator car comprising; a series of controls outside the car, one for each of a plurality of floors; car actuating and stopping mechanism; means responsive, when the car is idle, to the operation of any one of said controls, other than the one for the floor at which the car is positioned, for causing said mechanism to start the car from any one of said floors at which the car is positioned toward the floor corresponding to said one control operated; and means responsive to said controls for causing said mechanism to stop the car, when traveling in a certain direction, at the floors corresponding to said controls operated, in the natural order of floors, regardless of the order in which said controls are operated, said first named means being responsive, after each of such stops in said certain direction, to the controls for floors beyond that at which the car is stopped, operated prior to the initiation of the stopping operation for said floor at which the car is stopped, for causing said mechanism to start said car from such floor in said certain direction and responsive, after the last stop in said certain direction in response to said controls, to operated controls, for floors in the opposite direction from the floor at which such last stop is made, for causing said mechanism to start the car from such floor in the opposite direction, and said second named means, when the car is traveling in the opposite direction, being responsive to only that one of said controls which is for the farthest floor in the opposite direction, of those operated prior to the arrival of the car in the stopping zone for said farthest floor, for causing said mechanism to stop the car at said farthest floor.

10. A control system for an elevator comprising; a series of up control switches outside the car, one for each of a plurality of floors; a series of down control switches outside the car, one for each of said floors; a car actuating and stopping mechanism; means responsive, when the car is idle, to the operation of any one of said control switches, other than those for the floor at which the car is positioned, for causing said mechanism to start the car from any one of said floors at which the car is positioned toward the floor corresponding to said one control switch operated; and means, responsive to said up control switches for causing said mechanism to stop the car, when traveling in the up direction, at the floors corresponding to said up control switches operated, in the natural order of floors, regardless of the order in which said up control switches are operated, and responsive to said down control switches for causing said mechanism to stop the car, when traveling in the down direction, at the floors corresponding to said down control switches operated, in the natural order of floors, regardless of the order in which said down control switches are operated.

11. A control system for an elevator car comprising an up and down floor-relay for each of a plurality of landings controllable manually therefrom, and a single control means on the car for each of said landings each effective to cause actuation of the up or down floor-relay of the landing corresponding thereto, one at a time depending on the position of the car at the time it is actuated.

12. A control system for an elevator car comprising up and down floor-relays for each of a plurality of landings controllable manually therefrom, and a single control means on the car for each of said landings, each effective so that any actuated for landings above the position of the car causes actuation of its associated up floor-relay, and any actuated for landings below the position of the car, causes actuation of its associated down floor-relay.

13. A control system for an elevator car comprising an up and down floor-relay switch for each of a plurality of landings each having a winding operatively associated therewith, means operable from each landing to cause energization of the windings of its associated up and down floor-relay switches, a single push-button and a circuit for each of said landings controllable from the car, and means for each of said landings to control its circuit so that any car push-button for a landing above the position of the car causes energization of its associated up floor-relay winding, and any car push-button for a landing below the position of the car causes energization of its associated down floor-relay winding.

14. A control system for an elevator car comprising an up and down floor-relay for each of a plurality of landings controllable manually therefrom, a single control means on the car for each of said landings to cause actuation of the up or down floor-relays of the landing corresponding thereto one at a time depending on the position of the car at the time it is actuated, and circuits controlled by the floor-relays for each of said landings, whereby either relay for any landing is effective to cause start of the car toward its landing.

15. A control system for an elevator car comprising an up and down floor-relay for each of a plurality of landings, a single control means on the car for each of said landings to cause actuation of the up and down floor-relay of the landing corresponding thereto one at a time depending on the position of the car at the time it is actuated; circuits controlled by the floor-relays for each of said landings whereby either relay for any landing is effective to cause start of the car toward its landing, and circuits controlled by said relays effective to cause stop of the car at landings successively in their natural order regardless of the order in which said relays are actuated.

16. A control system for an elevator car comprising a floor-relay switch for each of a plurality of landings each having a winding and a self-holding circuit therefor, car actuated floor-selector switch mechanism normally open-circuited, and a car control circuit for each of said landings each circuit partially closed by its associated floor-relay switch when in actuated position and said circuits being completed successively and momentarily by their associated floor-selector switches.

17. A control system for an elevator car comprising an up hall button and a down hall button for each of a plurality of floors, and means for causing the stopping of the car, when traveling in a given direction, at any one of said floors in response to the operation of either one of the hall buttons for that floor under certain conditions of operation and in response to the operation of only a certain one of the hall buttons for that floor under certain other conditions of operation.

18. A control system for an elevator car comprising an up hall button and a down hall button at each of a plurality of floors, a car button for each of said floors, and means for causing the stopping of the car, when traveling in a given direction, at any one of said floors in response to the operation of any one of the buttons for that floor under conditions where no car buttons or hall buttons for other floors are operated and in response to the operation of only a certain one of the hall buttons and the car button for that floor under conditions where a car button or hall button for a floor beyond that floor in said given direction is operated.

19. A control system for an elevator car operable past a plurality of floors comprising an up control for each of said floors, a down control for each of said floors, means responsive to operated up controls for causing the stopping of the car at the corresponding floors during up travel of said car, in the natural order of such floors regardless of the order of operation of the corresponding controls, and means disposed to respond to operated down controls to cause the stopping of said car at the corresponding floors during up travel of said car, said second-named means being ineffective to stop said car at any floor during up travel of said car if a control for a floor higher than said any floor is operated.

20. A control system for an elevator car operable past a plurality of floors comprising, an up control for each of said floors, a down control for each of said floors, means responsive to operated down controls for causing the stopping of the car at the corresponding floors during down travel of the car, in the natural order of such floors regardless of the order of operation of the corresponding controls, and means disposed to respond to operated up controls to cause the stopping of the car at the corresponding floors during downward travel of the car, said second-named means being ineffective to stop the car at any floor during downward travel of the car if a control for a floor lower than said any floor is operated.

21. A control system for an elevator car operable past a plurality of floors comprising, an up control for each of said floors, a down control for each of said floors, means responsive to operated up controls for causing the stopping of the car at the corresponding floors successively in the natural order of floors during up travel of the car regardless of the order of operation of the corresponding controls, and means controlled by operated down controls and disposed to cause the stopping of the car at the corresponding floors during up travel of the car, said last-named means being effective to stop the car at any floor during up travel of the car providing no control for a floor higher than said any floor is operated.

22. A control system for an elevator car operable past a plurality of floors comprising, an up control for each of said floors, a down control for each of said floors, means responsive to operated down controls for causing the stopping of the car at the corresponding floors successively in the natural order of floors during down travel of the car, regardless of the order of operation of the corresponding controls, and means controlled by operated up controls and disposed to cause the stopping of the car at the corresponding floors during down travel of the car, said last-named means being effective to stop the car at any floor during down travel of the car, providing no control for a floor lower than said any floor is operated.

23. A control system for an elevator car operable past a plurality of floors comprising, an up control for each of said floors, a down control for each of said floors, stopping mechanism for said car, means responsive to operated up controls for actuating said stopping mechanism successively in the natural order of floors as said car approaches said floors traveling upwardly, regardless of the order of operation of the corresponding controls, means responsive to operated down controls, and means responsive during upward travel of the car to the approach of said car to the highest floor for which a control is operated for rendering said second-named means effective to actuate said stopping mechanism.

24. A control system for an elevator car operable past a plurality of floors comprising, an up control for each of said floors, a down control for each of said floors, stopping mechanism for said car, means responsive to operated down controls for actuating said stopping mechanism successively in the natural order of floors as said car approaches said floors traveling downwardly, regardless of the order of operation of the corresponding controls, means responsive to operated up controls, and means responsive during downward travel of the car to the approach of said car to the lowest floor for which a control is operated for rendering said second-named means effective to actuate said stopping mechanism.

25. A control system for an elevator car operable past a plurality of floors comprising an up control for each of said floors; a down control for each of said floors; stopping mechanism for said car; means responsive to operated up controls comprising mechanism for causing the actuation of said stopping mechanism successively in the natural order of floors as said car approaches said floors moving upwardly, regardless of the order of operation of the corresponding controls; means responsive to operated down controls comprising mechanism for causing the actuation of said stopping mechanism successively in the natural order of floors as said car approaches said floors moving downwardly, regardless of the order of operation of the corresponding controls, and means to render said last-named means effective to cause the actuation of said stopping mechanism during upward travel of the car upon the approach of the car to the highest floor for which a control is operated.

26. A control system for an elevator car operable past a plurality of floors comprising an up control for each of said floors; a down control for each of said floors; stopping mechanism for said car; means responsive to operated down controls comprising mechanism for causing the actuation of said stopping mechanism successively in the natural order of floors as said car approaches said floors moving downwardly, regardless of the order of operation of the corresponding controls; means responsive to operated up controls comprising mechanism for causing the actuation of said stopping mechanism successively in the natural order of floors as said car approaches said floors moving upwardly, regardless of the order of operation of the corresponding controls; and means to render said last-named means effective to cause the actuation of said stopping mechanism during downward travel of the car upon the approach of the car to the lowest floor for which a control is operated.

27. A control system for an elevator car operable past a plurality of floors comprising, an up control for each of said floors; a down control for each of said floors; stopping mechanism for said car; means responsive to operated up controls for actuating said stopping mechanism successively as said car approaches the corresponding floors traveling upwardly, in the natural order of such floors, regardless of the order of operation of the corresponding controls, directional switching mechanism adapted to actuate said stopping mechanism; and means controlled by operated down controls for cooperating with said directional switching mechanism to actuate said stopping mechanism upon the approach of said car during upward travel to the highest floor for which a control is operated.

28. A control system for an elevator car operable past a plurality of floors comprising, an up control for each of said floors; a down control for each of said floors; stopping mechanism for said car; means responsive to operated down controls for actuating said stopping mechanism successively as said car approaches the corresponding floors traveling downwardly, in the natural order of such floors, regardless of the order of operation of the corresponding controls, directional switching mechanism adapted to actuate said stopping mechanism; and means controlled by operated up controls for cooperating with said directional switching mechanism to actuate said stopping mechanism upon the approach of said car during downward travel to the lowest floor for which a control is operated.

29. A control system for an elevator car operable past a plurality of floors comprising, an up control for each of said floors; a down control for each of said floors; and stopping mechanism for said car, comprising means responsive during upward travel of the car to the approach of the car to floors for which up controls are operated for successively actuating said stopping mechanism to stop said car at the corresponding floors in the natural order of such floors, regardless of the order of operation of the corresponding controls, and responsive during upward travel of the car to the approach of the car to the highest floor for which a control is operated for actuating said stopping mechanism to stop said car at that floor, regardless of whether said last-mentioned control is an up control or a down control.

30. A control system for an elevator car operable past a plurality of floors comprising, an up control for each of said floors; a down control for each of said floors; and stopping mechanism for said car, comprising means responsive during downward travel of the car to the approach of the car to floors for which down controls are operated for successively actuating said stopping mechanism to stop said car at the corresponding floors in the natural order of such floors, regardless of the order of operation of the corresponding controls, and responsive during downward travel of the car to the approach of the car to the lowest floor for which a control is operated for actuating said stopping mechanism to stop said car at that floor, regardless of whether said last-mentioned control is an up control or a down control.

31. A control system for an elevator car operable past a plurality of floor landings comprising, an up control for each of said floors; a down control for each of said floors; and mechanism for stopping said car at said floors during upward travel of the car comprising, means responsive to the approach of the car to floors for which up controls are operated for successively actuating said stopping mechanism to stop the car at the corresponding floors in the natural order of such floors, regardless of the order of operation of the corresponding controls, and means responsive to the approach of the car to the highest floor for which a control is operated for actuating said stopping mechanism to stop the car at such highest floor, regardless of whether said last-mentioned control is an up control or a down control.

32. A control system for an elevator car operable past a plurality of floor landings comprising, an up control for each of said floors; a down control for each of said floors; and mechanism for stopping said car at said floors during downward travel of the car comprising, means responsive to the approach of the car to floors for which down controls are operated for successively actuating said stopping mechanism to stop the car at the corresponding floors in the natural order of such floors, regardless of the order of operation of the corresponding controls, and means responsive to the approach of the car to the lowest floor for which a control is operated for actuating said stopping mechanism to stop the car at such lowest floor, regardless of whether said last-mentioned control is an up control or a down control.

33. A control system for an elevator car operable past a plurality of floors comprising, an up control for each of said floors; a down control for each of said floors; and mechanism for stopping said car comprising means responsive during up car travel to the approach of the car to floors for which up controls are operated for successively actuating said stopping mechanism to stop said car at the corresponding floors in the natural order of such floors, regardless of the order of operation of the corresponding controls, means responsive during down car travel to the approach of the car to floors for which down controls are operated for successively actuating said stopping mechanism to stop said car at the corresponding floors in the natural order of such floors, regardless of the order of operation of the corresponding controls, and means responsive during travel in one direction to the approach of said car to the farthest floor in that direction for which a control is operated for actuating said stopping mechanism to stop said car at said farthest floor regardless of whether said last-mentioned control is an up control or a down control.

34. A control system for an elevator car operable past a plurality of floors comprising, an up control for each of said floors; a down control for each of said floors; floor selector mechanism for said car; stopping mechanism for said car comprising means controlled jointly by said floor selector mechanism and said up controls for causing said car to stop, during upward travel, at the floors corresponding to operated up controls in the natural order of such floor regardless of the order of operation of the corresponding controls, means controlled jointly by said floor selector mechanism and said down controls for causing said car to stop, during downward travel, at the floors corresponding to operated down controls in the natural order of such floors regardless of the order of operation of the corresponding controls, and means responsive to the approach of the car during travel in one direction to the farthest floor in that direction for which a control is operated for causing said car to stop at said floor, regardless of whether said last mentioned control is an up control or a down control.

35. A control system for an elevator car comprising, a series of controls, one for each of a plurality of floors, and means responsive to said controls for causing the car, when traveling in a certain direction, to stop at the floors corresponding to said controls operated in the natural order of floors, regardless of the order in which said controls are operated, and responsive, when the car is traveling in the opposite direction, to but one of said controls, of those operated prior to the arrival of the car at a predetermined distance from the floor corresponding to said control operated, for causing the car to stop at said floor.

36. A control system for an elevator car comprising; an up control at each of a plurality of floors; car actuating and stopping mechanism; and means responsive to said up controls for causing said mechanism to stop the car, when traveling in the up direction, at the floors corresponding to said up controls operated, in the natural order of floors, regardless of the order in which said up controls are operated, and responsive, when the car is traveling in the down direction, to the up control at the farthest floor in the down direction, of the up controls operated prior to the arrival of the car in the stopping zone for such farthest floor regardless of the number of such up controls operated, for causing said mechanism to stop the car at said farthest floor.

37. A control system for an elevator car comprising; a down control at each of a plurality of floors; car actuating and stopping mechanism, and means responsive to said down controls for causing said mechanism to stop the car, when traveling in the down direction, at the floors corresponding to said down controls operated, in the natural order of floors, regardless of the order in which said down controls are operated, and responsive, when the car is traveling in the up direction, to the down control at the farthest floor in the up direction, of the down controls operated prior to the arrival of the car in the stopping zone for said farthest floor, regardless of the number of said down controls operated, for causing said mechanism to stop the car at said farthest floor.

38. A control system for an elevator car comprising; a plurality of controls outside the car, one for each of a plurality of floors, car actuating and stopping mechanism; and means responsive to said controls for causing said mechanism to stop the car, when traveling in a certain direction, at the floors corresponding to said controls operated, in the natural order of floors, regardless of the order in which said controls are operated, and, when the car is traveling in the opposite direction, responsive to any of said controls, for floors beyond any given floor, operated prior to the arrival of the car at a predetermined distance from said given floor, for causing said mechanism to run the car past said given floor without stopping it in response to said control for said given floor, and, upon the arrival of the car in said opposite direction at a predetermined distance from a floor for which the control is operated under conditions where none of said controls are operated for floors beyond such floor, responsive to said control for such floor for causing said mechanism to stop the car at such floor.

39. A control system for an elevator car comprising; a series of up control switches without the car, one for each of a plurality of floors; a series of down control switches without the car, one for each of said floors; car actuating and stopping mechanism; and means responsive to up control switches and the down control switch for a floor above the highest floor for which an up control switch is operated for causing said mechanism to stop the car, when traveling in the up direction, at the floors corresponding to up control switches and said down control switch operated, in the natural order of floors, regardless of the order in which said up control switches and said down control switch are operated, and responsive to down control switches and the up control switch for a floor below the lowest floor for which a down control switch is operated for causing said mechanism to stop the car, when traveling in the down direction, at the floors corresponding to down control switches and said up control switch operated, in the natural order of floors, regardless of the order in which said down control switches and said up control switch are operated.

40. A control system for an elevator car comprising; a series of up control switches, one for each of a plurality of floors; a series of down control switches, one at each of said floors; car actuating and stopping mechanism; means responsive to up control switches and the down control switch at a floor above the highest floor at which an up control switch is operated for causing said mechanism to stop the car, when traveling in the up direction, at the floors at which up control switches and said down control switch are operated, in the natural order of floors, regardless of the order in which said up control switches and said down control switch are operated, and responsive to down control switches and the up control switch at a floor below the lowest floor at which a down control switch is operated for causing said mechanism to stop the car, when traveling in the down direction, at the floors at which down control switches and said up control switch are operated, in the natural order of floors, regardless of the order in which said down control switches and said up control switch are operated; and means for preventing said first named means causing said car actuating and stopping mechanism to stop the car, when traveling in the up direction, in response to down control switches other than the one specified and, when traveling in the down direction, in response to up control switches other than the one specified.

41. A control system for an elevator car operable past a plurality of floors comprising a control for each of said floors, mechanism responsive to the position of said car, and means controlled jointly by said controls and said mechanism to cause the car to stop successively and in the natural order of floors at floors for which the controls are operated during travel of the car in one direction, regardless of the order of operation of said controls and, during travel of the car in the other direction, to stop only at the farthest floor in such other direction for which a control is operated.

42. A control system for an elevator car operable past a plurality of floors comprising a control for each of said floors, means for stopping said car, means for rendering said stopping mechanism responsive to operated controls during travel of the car in one direction to cause the car to stop at the corresponding floors successively and in the natural order of such floors, regardless of the order of operation of said controls, and, during travel of the car in the other direction, for rendering said stopping means responsive to only that control, of a plurality of operated controls, which corresponds to the farthest floor in such other direction for which a control is operated.

43. A control system for an elevator car operable past a plurality of floors comprising a control for each of said floors, means for stopping said car, means for rendering said stopping means responsive to said controls during travel of the car in one direction to cause the car to stop successively at floors for which controls are operated in the natural order of such floors regardless of the order in which such switches are operated, and additional means, effective during travel of the car in the other direction, for rendering said stopping means responsive to only that control, of a plurality of operated controls, which corresponds to the farthest floor in said other direction for which a control is operated.

44. A control system for an elevator car operable past a plurality of floors, comprising a control for each of said floors; means for causing said car to stop at said floors comprising means responsive to said controls, means responsive to the position of said car, connections between said last two mentioned means for causing the stopping of the car, when traveling in one direction, to occur successively in the natural order of approach to floors for which controls are operated, regardless of the order of operation of said controls, and additional connections between said last two mentioned means for causing said car, when traveling in the other direction to stop at the farthest floor in such other direction for which a control is operated, and to pass floors for which controls are operated, other than such farthest floor, without stopping.

45. A control system for an elevator car operable past a plurality of floors, an up control for each of said floors, a down control for each of said floors, a relay individual to each control and actuable thereby, means responsive when the car is standing at any of said floors to actuation of either relay for a floor other than the floor at which the car is standing for causing the car to start directly toward the corresponding landing.

46. A control system for an elevator car operable past a plurality of floors comprising, an up control for each of said floors; a down control for each of said floors; a relay individual to each of said controls and actuable thereby; means for starting said elevator; and means, comprising means operable in accordance with the position of said car and responsive when the car is standing at any of said floors to either actuated relay for a floor other than the floor at which the car is standing for actuating said starting means to cause said car to start directly towards the floor corresponding to said actuated relay.

47. A control system for an elevator car comprising a series of controls outside the car, one for each of a plurality of floors; car actuating and stopping mechanism; means responsive to the operation of any of said controls, other than the one for the floor at which the car is positioned, for causing said mechanism to start the car; and means responsive to said controls for causing said mechanism to stop the car, when traveling in a certain direction, at the floors corresponding to said controls operated, in the natural order of floors, regardless of the order in which said controls are operated, and, when the car is traveling in the opposite direction, responsive to but one of said controls, of those operated prior to the arrival of the car at a predetermined distance from the floor corresponding to said one control operated, for causing said mechanism to stop the car at said floor.

48. A control system for an elevator car comprising; a series of down control switches outside the car, one for each of a plurality of floors; car actuating and stopping mechanism; means responsive, when the car is idle, to the operation of any one of said down control switches, other than the one for the floor at which the car is positioned, for causing said mechanism to start the car from any one of said floors at which the car is positioned toward the floor corresponding to said one down control switch operated; and means responsive to said down control switches for causing said mechanism to stop the car, when traveling in the down direction, at the floors corresponding to said down control switches operated, in the natural order of floors, regardless of the order in which said down control switches are operated, and, when the car is traveling in the up direction, responsive to but one of said down control switches, of those operated prior to the arrival of the car in the stopping zone for the floor corresponding to said one down control switch operated, for causing said mechanism to stop the car at said floor.

49. A control system for an elevator car comprising; a series of up control switches outside the car, one for each of a plurality of floors; car actuating and stopping mechanism, means responsive, when the car is idle, to the operation of any one of said up control switches, other than the one for the floor at which the car is positioned, for causing said mechanism to start the car from any one of said floors at which the car is positioned toward the floor corresponding to said one up control switch operated; and means responsive to said up control switches for causing said mechanism to stop the car, when traveling in the up direction, at the floors corresponding to said up control switches operated, in the natural order of floors, regardless of the order in which said up control switches are operated, and, when the car is traveling in the down direction, responsive to but one of said up control switches, of those operated prior to the arrival of the car in the stopping zone for the floor corresponding to said one up control switch operated, for causing said mechanism to stop the car at said floor.

50. A control system for an elevator car comprising; a series of controls outside the car, one for each of a plurality of floors; car actuating and stopping mechanism; means responsive, when the car is idle, to the operation of any one of said controls, other than the one for the floor at which the car is positioned, for causing said mechanism to start the car from any one of said floors at which the car is positioned toward the floor corresponding to said one control operated; and means responsive to said controls for causing said mechanism to stop the car, when traveling in a certain direction, at the floors corresponding to said controls operated, in the natural order of floors, regardless of the order in which said controls are operated, said first named means being responsive, after each of such stops in said certain direction, to the controls for floors beyond that at which the car is stopped, operated prior to the initiation of the stopping operation for said floor at which the car is stopped, for causing said mechanism to start the car from such floor in said certain direction, and said second named means, when the car is traveling in the opposite direction, being responsive to only that one of said controls which is for the farthest floor in the opposite direction, of those operated prior to the arrival of the car in the stopping zone for said farthest floor, for causing said mechanism to stop the car at said farthest floor.

51. A control system for an elevator car comprising; a series of up control switches outside the car, one for each of a plurality of floors; a series of down control switches outside the car, one for each of said floors; car actuating and stopping mechanism; means responsive, when the car is idle, to the operation of any one of said control switches, other than those for the floor at which the car is positioned, for causing said mechanism to start the car from any one of said floors at which the car is positioned toward the floor corresponding to said one control switch operated; and means responsive to said up control switches for causing said mechanism to stop the car, when traveling in the up direction at the floors corresponding to said up control switches operated, in the natural order of floors, regardless of the order in which said up control switches are operated, said first named means being responsive, after each of such stops in the up direction, to the up control switches for floors above that at which the car is stopped, operated prior to the initiation of the stopping operation for said floor at which the car is stopped, for causing said mechanism to start the car from such floor in the up direction, said second named means, when the car is traveling in the down direction, being responsive to said down control switches for causing said mechanism to stop the car at the floors corresponding to said down control switches operated, in the natural order of floors, regardless of the order in which said down control switches are operated, and said first named means being responsive, after each of such stops in the down direction, to the down control switches for floors below that at which the car is stopped, operated prior to the initiation of the stopping operated for said floor at which the car is stopped, for causing the starting of the car from such floor in the down direction.

52. A control system for an elevator car comprising; a series of up control switches outside the car, one for each of a plurality of floors; a series of down control switches outside the car, one for each of said floors; car actuating and stopping mechanism; starting means responsive, when the car is idle, to the operation of any one of said control switches for causing said mechanism to start the car toward the floor corresponding to said one control switch operated; and stopping means responsive to up control switches for causing said mechanism to stop the car, when traveling in the up direction, at the floors corresponding to up control switches operated, in the natural order of floors, regardless of the order in which said up control switches are operated, said starting means being responsive, after each of such stops in the up direction, to up control switches for floors above that at which the car is stopped, operated prior to the initiation of the stopping operation for said floor at which the car is stopped, for causing said mechanism to start the car from such floor in the up direction, and, in the event that one or more down control switches, for floors above that at which the last stop in the up direction in response to up control switches is made, are operated prior to the initiation of such last stop in the up direction, said starting means being responsive to said operated down control switches for causing said mechanism to start the car in the up direction after such last stop in the up direction and said stopping means being responsive to but one of such operated down control switches for causing said mechanism to stop the car at the floor corresponding to such one operated down control switch, and said stopping means, when the car is traveling in the down direction, being responsive to said down control switches for causing said mechanism to stop the car at the floors corresponding to down control switches operated, in the natural order of floors, regardless of the order in which said down control switches are operated, said starting means being responsive, after each of such stops in the down direction, to the down control switches for floors below that at which the car is stopped, operated prior to the initiation of the stopping operation for said floor at which the car is stopped, for causing said mechanism to start the car from such floor in the down direction, and, in the event that one or more up control switches, for floors below that at which the last stop in the down direction in response to down control switches is made, are operated prior to the initiation of such last stop in the down direction, said starting means being responsive to such operated up control switches for causing said mechanism to start the car in the down direction after such last stop in the down direction and said stopping means being responsive to but one of such operated up control switches for causing said mechanism to stop the car at the floor corresponding to such one operated up control switch.

53. A control system for an elevator car comprising; a series of up control switches, one at each of a plurality of floors; a series of down control switches, one at each of said floors; car actuating and stopping mechanism; starting means responsive, when the car is idle, to the operation of any one of said control switches for causing said mechanism to start the car toward the floor corresponding to said one control switch operated; stopping means responsive to up control switches for causing said mechanism to stop the car, when traveling in the up direction, at the floors at which up control switches are operated, in the natural order of floors, regardless of the order in which said up control switches are operated, said starting means being responsive, after each of such stops in the up direction, to up control switches at floors above that at which the car is stopped, operated prior to the initiation of the stopping operation for said floor at which the car is stopped, for causing said mechanism to start the car from such floor in the up direction, and, in the event that one or more down control switches, at floors above that at which the last stop in the up direction in response to up control switches is made, are operated prior to the initiation of such last stop in the up direction, said starting means being responsive to such operated down control switches for causing said mechanism to start the car in the up direction after such last stop in the up direction and said stopping means being responsive to that one of the operated down control switches for the farthest floor in the up direction for causing said mechanism to stop the car at such farthest floor, and said stopping means, when the car is traveling in the down direction, being responsive to said down control switches for causing said mechanism to stop the car at the floors at which down control switches are operated, in the natural order of floors, regardless of the order in which said down control switches are operated, said starting means being responsive, after each of such stops in the down direction, to the down control switches at floors below that at which the car is stopped, operated prior to the initiation of the stopping operation for said floor at which the car is stopped, for causing said mechanism to start the car from such floor in the down direction, and, in the event that one or more up control switches, at floors below that at which the last stop in the down direction in response to down control switches is made, are operated prior to the initiation of such last stop in the down direction, responsive to such operated up control switches for causing said mechanism to start the car in the down direction after such last stop in the down direction and said stopping means being responsive to that one of the operated up control switches for the farthest floor in the down direction for causing said mechanism to stop the car at such farthest floor; and means for preventing said stopping means causing said mechanism to stop the car, when traveling in the up direction, in response to down control switches other than the one specified and, when traveling in the down direction, in response to up control switches other than the one specified.

54. A control system for an elevator car comprising; a series of up controls, one for each of a plurality of floors; a series of down controls, one for each of said floors; a plurality of up and down controls, one for each of said floors; car actuating and stopping mechanism; starting means responsive to the operation of any one of said controls for causing said mechanism to start the car toward the floors corresponding to said one control operated; and stopping means responsive to said up and down controls and said up controls for causing said mechanism to stop the car, when traveling in the up direction, at the floors corresponding to said up and down controls and up controls operated, in the natural order of floors, regardless of the order in which said up and down controls and up controls are operated, said starting means being responsive, after each of such steps in the up direction, to the up and down controls and up controls for floors above that at which the car is stopped, operated prior to the initiation of the stopping operation for said floors at which the car is stopped, for causing said mechanism to start the car from said floor in the up direction, and in the event that a down control for a floor above that at which the last stop in the up direction in response to up and down controls and up controls is made is operated prior to the initiation of such last stop in the up direction, said starting means being responsive to such operated down control for causing said mechanism to start the car in the up direction after such last stop in the up direction and said stopping means being responsive to such operated down control for causing said mechanism to stop the car at the floor corresponding to such operated down control, and said stopping means, when the car is travelling in the down direction, being responsive to said up and down controls and said down controls for causing said mechanism to stop the car at the floors corresponding to said up and down controls and down controls operated, in the natural order of floors, regardless of the order in which said up and down controls and down controls are operated, said starting means being responsive, after each of such stops in the down direction, to the up and down controls and down controls for floors below that at which the car is stopped, operated prior to the initiation of the stopping operation for said floor at which the car is stopped, for causing said mechanism to start the car from said floor in the down direction, and, in the event that an up control for a floor below that at which the last stop in the down direction in response to up and down controls and down controls is made is operated prior to the initiation of such last stop in the down direction, said starting means being responsive to such operated up control for causing said mechanism to start the car in the down direction after such last stop in the down direction and said stopping means being responsive to such operated up control for causing said mechanism to stop the car at the floor corresponding to such operated up control.

55. A control system for an elevator car comprising a series of control switches within the car, one for each of a plurality of floors; a series of up control switches, one at each of said floors; a series of down control switches, one at each of said floors; car actuating and stopping mechanism; starting means responsive to the operation of any one of said control switches for causing said mechanism to start the car toward the floor corresponding to said one control switch operated; and stopping means responsive to said control switches within the car and said up control switches for causing said mechanism to stop the car, when traveling in the up direction, at the floors corresponding to control switches within the car and up control switches operated, in the natural order of floors regardless of the order in which said control switches within the car and up control switches are operated, said starting means being responsive, after each of such stops in the up direction, to the control switches within the car and up control switches for floors above that at which the car is stopped, operated prior to the initiation of the stopping operation for said floor at which the car is stopped, for causing said mechanism to start the car from said floor in the up direction, and, in the event that one or more down control switches, for floors above that at which the last stop in the up direction in response to control switches within the car and up control switches is made, are operated, prior to the initiation of such last stop in the up direction, said starting means being responsive to such operated down control switches for causing said mechanism to start the car in the up direction after such last stop in the up direction and said stopping means being responsive to that one of the operated down control switches for the farthest floor in the up direction for causing said mechanism to stop the car at said farthest floor, and said stopping means, when the car is traveling in the down direction, being responsive to said control switches within the car and said down control switches for causing said mechanism to stop the car at the floors corresponding to control switches within the car and down control switches operated, in the natural order of floors, regardless of the order in which said control switches within the car and down control switches are operated, said starting means being responsive, after each of such stops in the down direction, to the control switches within the car and down control switches for floors below that at which the car is stopped, operated prior to the initiation of the stopping operation for said floor at which the car is stopped, for causing said mechanism to start the car from said floor in the down direction, and, in the event that one or more up control switches, for floors below that at which the last stop in the down direction in response to control switches within the car and down control switches is made, are operated prior to the initiation of such last stop in the down direction, said starting means being responsive to such operated up control switches for causing said mechanism to start the car in the down direction after such last stop in the down direction and said stopping means being responsive to that one of the operated up control switches for the farthest floor in the down direction for causing said mechanism to stop the car at such farthest floor.

56. A control system for an elevator car comprising; a series of control switches within the car, one for each of a plurality of floors; a series of up control switches, one at each of said floors, a series of down control switches, one at each of said floors; car actuating and stopping mechanism, starting means responsive to the operation of any one of said control switches for causing said mechanism to start the car toward the floor corresponding to said one control switch operated; and stopping means responsive to said control switches within the car and said up control switches for causing said mechanism to stop the car, when traveling in the up direction, at the floors corresponding to control switches within the car and up control switches operated, in the natural order of floors, regardless of the order in which said control switches within the car and up control switches are operated, responsive after each of such stops in the up direction, to the control switches within the car and up control switches for floors above that at which the car is stopped, operated prior to the initiation of the stopping operation for said floor at which the car is stopped, for causing said mechanism to start the car from such floor in the up direction, and, in the event that one or more down control switches, for floors above that at which the last stop in the up direction in response to control switches within the car and up control switches is made, are operated prior to the initiation of such last stop in the up direction, said starting means being responsive to such operated down control switches for causing said mechanism to start the car in the up direction after such last stop in the up direction and said stopping means being responsive to that one of such operated down control switches for the farthest floor in the up direction for causing said mechanism to stop the car at said farthest floor, and said stopping means, when the car is traveling in the down direction, being responsive to said control switches within the car and said down control switches for causing said mechanism to stop the car at the floors corresponding to control switches within the car and down control switches operated, in the natural order of floors, regardless of the order in which said control switches within the car and down control switches are operated, said starting means being responsive, after each of such stops in the down direction, to the control switches within the car and down control switches for floors below that at which the car is stopped, operated prior to the initiation of the stopping operation for said floor at which the car is stopped, for causing said mechanism to start the car from such floor in the down direction, and, in the event that one or more up control switches, for floors below that at which the last stop in the down direction in response to control switches within the car and down control switches is made, are operated prior to the initiation of such last stop in the down direction, said starting means being responsive to such operated up control switches for causing said mechanism to start the car in the down direction after such last stop in the down direction and said stopping means being responsive to that one of such operated up control switches for the farthest floor in the down direction for causing said mechanism to stop the car at such farthest floor; and means for preventing said stopping means causing said mechanism to stop the car, when traveling in the up direction, in response to down control switches other than the one specified and, when traveling in the down direction, in response to up control switches other than the one specified.

57. A control system for an elevator car comprising; a series of control switches within the car, one for each of a plurality of floors; a series of up control switches, one at each of said floors; a series of down control switches, one at each of said floors; car actuating and stopping mechanism; starting means responsive to the operation of any one of said control switches for causing said mechanism to start the car toward the floor corresponding to said one control switch operated; stopping means responsive to said control switches within the car and said up control switches for causing said mechanism to stop the car, when traveling in the up direction, at the floors corresponding to control switches within the car and up control switches operated, in the natural order of floors, regardless of the order in which said control switches within the car and up control switches are operated, said starting means being responsive, after each of such stops in the up direction, to the control switches within the car and up control switches for floors above that at which the car is stopped, operated prior to the initiation of the stopping operation for said floor at which the car is stopped, for causing said mechanism to start the car from such floor in the up direction, and, in the event that one or more down control switches, for floors above that at which the last stop in the up direction in response to control switches within the car and up control switches is made, are operated prior to the initiation of such last stop in the up direction, said starting means being responsive to such operated down control switches for causing said mechanism to start the car in the up direction after such last stop in the up direction and said stopping means being responsive to that one of such operated down control switches for the farthest floor in the up direction for causing said mechanism to stop the car at said farthest floor, and said starting means, after the last stop in the up direction in response to any one of said control switches, being responsive to operated control switches, for floors in the down direction from the floor at which such last stop in the up direction in response to any one of said control switches is made, for causing said mechanism to start the car from such floor in the down direction, and said stopping means, when the car is traveling in the down direction, being responsive to said control switches within the car and said down control switches for causing said mechanism to stop the car at the floors corresponding to control switches within the car and down control switches operated, in the natural order of floors, regardless of the order in which said control switches within the car and down control switches are operated, said starting means being responsive, after each of such stops in the down direction, to the control switches within the car and down control switches for floors below that at which the car is stopped, operated prior to the initiation of the stopping operation for said floor at which the car is stopped, for causing said mechanism to start the car from such floor in the down direction, and, in the event that one or more up control switches, for floors below that at which the last stop in the down direction in response to control switches within the car and down control switches is made, are operated prior to the initiation of such last stop in the down direction, said starting means being responsive to such operated up control switches for causing said mechanism to start the car in the down direction after such last stop in the down direction and said stopping means being responsive to that one of such operated up control switches for the farthest floor in the down direction for causing said mechanism to stop the car at such farthest floor, and said starting means, after the last stop in the down direction in response to any one of said control switches, being responsive to operated control switches, for floors in the up direction from the floor at which such last stop in the down direction in response to any one of said control switches is made, for causing said mechanism to start the car from such floor in the up direction; and means for preventing said stopping means causing said mechanism to stop the car, when traveling in the up direction, in response to down control switches other than the one specified and, when traveling in the down direction, in response to up control switches other than the one specified.

58. A control system for an elevator car operable past a plurality of floors comprising, a control for each of said floors, means responsive, when the car is idle, to an operation of any one of said controls for floors other than the floor at which the car is standing, for causing said car to start toward the floor corresponding to said one control, means responsive to said operation of said one control to stop the car upon its arrival at the corresponding floor from one direction, means disposed to respond to said operation of said one control to stop the car upon its arrival at the corresponding floor from the other direction, said last named means being responsive during travel of the car in said other direction to operation of another of said controls for a floor farther in said other direction for causing said car to pass the floor corresponding to said one control without stopping.

59. A control system for an elevator car operable past a plurality of floors, comprising, a control for each of said floors, means responsive when the car is idle to any one of said controls for floors other than the one at which the car is standing for causing said car to start directly toward the floor corresponding to said one control; means responsive to said controls, during travel of said car in one direction, for causing said car to stop successively at the corresponding floors in the natural order of such floors, regardless of the order of operation of said controls, and during travel of said car in the other direction, responsive only to that control, of a plurality of operated controls, which corresponds to the farthest floor in said other direction for which a control is operated, for causing said car to stop at said farthest floor.

60. A control system for an elevator car operable past a plurality of floors, comprising an up control and a down control for each of said floors, means responsive when the car is idle to either control for any one floor other than the floor at which the car is standing, for causing the car to start toward said one floor; means responsive during up travel of the car to said up controls for causing the car to stop successively at the corresponding floors in the natural order of such floors regardless of the order of operation of the corresponding controls; and means disposed to respond during up travel of the car to said down controls for causing the car to stop at the corresponding floors, said last named means being responsive to a control for a floor higher than any one floor for preventing the stopping of the car at said any one floor in response to the down control for that floor.

61. A control system for an elevator car operable past a plurality of floors, comprising an up control and a down control for each of said floors, means responsive when the car is idle to either control for any one floor other than the floor at which the car is standing, for causing the car to start toward said one floor; means responsive during down travel of the car to said down controls for causing the car to stop successively at the corresponding floors in the natural order of such floors regardless of the order of operation of the corresponding controls; and means disposed to respond during down travel of the car to said up controls for causing the car to stop at the corresponding floors, said last named means being responsive to a control for a floor lower than any one floor for preventing the stopping of the car at said any one floor in response to the up control for that floor.

62. A control system for an elevator car operable past a plurality of floors comprising, an operable control for each of said floors, means effective upon operation of each control to maintain it in operated condition until reset; mechanism responsive to the position of said car; means controlled jointly by operated controls and said mechanism for causing the car to start and continue in operation as long as operated controls remain unresponded to, means cooperating with said mechanism to cause the car, while traveling in one direction, to stop successively at floors corresponding to operated controls in the natural order of such floors, regardless of the order of operation of said controls, said second named means being effective, after the car has stopped at the farthest floor corresponding to an operated control in said one direction, to cause said car to start in the other direction; additional means cooperating with said mechanism to cause the car while traveling in the other direction to stop at the farthest floor in said other direction for which a control is operated and run past intervening floors without stopping; and means rendered effective when the car stops at a floor for resetting the control for that floor.

63. A control system for an elevator car operable past a plurality of floors comprising, an operable control for each of said floors, means effective upon operation of each control to maintain that control in operated condition until reset; mechanism responsive to operated controls to cause the car to start and to continue in operation after each stop as long as any of said controls remain operated, said mechanism comprising floor selector mechanism arranged to cause said car, while traveling in one direction to stop successively at floors corresponding to operated controls in the natural order of such floors regardless of the order of operation of said controls, reversing mechanism effective after the car has stopped at the farthest floor in one direction for which a control is operated to cause said car to start in the other direction, additional floor selector mechanism arranged to cause said car to stop at the farthest floor in said other direction for which a control is operated and to run past intervening floors for which controls are operated without stopping, and means rendered effective when the car stops at a floor for resetting the corresponding control.

64. A control system for an elevator car operable past a plurality of floors comprising an operable up control for each of said floors; an operable down control for each of said floors; means effective upon operation of each of said controls to maintain that control in operated condition until the car stops at the corresponding floor; mechanism responsive to any operated control for a floor above the position of the car to cause the car to start upwardly and to continue in operation after each stop as long as any of said controls remain operated, said mechanism comprising floor selector mechanism arranged to cause the car, during up travel, to stop successively at floors corresponding to operated up controls in the natural order of such floors regardless of the order of operation of the corresponding controls and to stop at a floor corresponding to an operated down control if such floor is the highest floor for which a control is operated, reversing mechanism effective after the car stops at such highest floor to cause said car to start in the down direction, and additional floor selector mechanism arranged to cause said car, during down travel to stop successively at the floor corresponding to operated down controls in the natural order of such floors regardless of the order of operation of the corresponding controls and to stop at a floor corresponding to an operated up control if such floor is the lowest floor for which a control is operated.

65. A control system for an elevator car operable past a plurality of floors comprising an operable up control for each of said floors; an operable down control for each of said floors; means effective upon operation of each of said controls to maintain that control in operated condition until the car stops at the corresponding floor; mechanism responsive to any operated control for a floor below the position of the car to cause the car to start downwardly and to continue in operation after each stop as long as any of said controls remain operated, said mechanism comprising floor selector mechanism arranged to cause the car, during down travel, to stop successively at floors corresponding to operated down controls in the natural order of such floors regardless of the order of operation of the corresponding controls and to stop at a floor corresponding to an operated up control if such floor is the lowest floor for which a control is operated, reversing mechanism effective after the car stops at such lowest floor to cause said car to start in the up direction, and additional floor selector mechanism arranged to cause said car, during up travel to stop successively at the floor corresponding to operated up controls in the natural order of such floors regardless of the order of operation of the corresponding controls and to stop at a floor corresponding to an operated down control if such floor is the highest floor for which a control is operated.

66. An elevator system comprising; an elevator car; a plurality of floors; a passenger operated interlock associated with said car; a series of controls outside the car, one for each of said floors; means responsive, with the car idle at any one of said floors, to the operation of any one of said controls for the other floors for causing the starting of the car; and means for preventing the response of said starting means to said controls for said other floors for a predetermined time interval after operation of said interlock.

67. An elevator system comprising; an elevator car, a plurality of floors; a passenger operated interlock associated with the car; a series of controls outside the car, one for each of said floors; means responsive, with the car idle at any one of said floors, to the operation of any one of said controls for the other floors for causing the starting of the car; and means for preventing the response of said starting means to said controls for said other floors for a predetermined time interval after operation of said interlock but for rendering said starting means responsive to such controls, upon the expiration of said predetermined time interval.

68. In a control system for an elevator car operable past a plurality of floors; an up control and a down control for each of said floors; and car starting and stopping mechanism disposed to respond to operation of any of said controls including means to cause said car to start, means effective during up travel for causing said car to stop successively at floors for which up controls are operated, in the natural order of such floors, regardless of the order of operation of the corresponding controls, means effective during down travel for causing said car to stop successively at floors for which down controls are operated in the natural order of such floors regardless of the order of operation of the corresponding controls, and means effective while said car is standing at a floor for rendering a control for that floor ineffective to cause said car to start.

LUTHER J. KINNARD.